Oct. 9, 1923. 1,470,339
T. P. WALLACE
METHOD OF TREATING COTTON SEED IN HANDLING, CLEANING, AND DELINTING
Filed Nov. 22, 1920  3 Sheets-Sheet 1
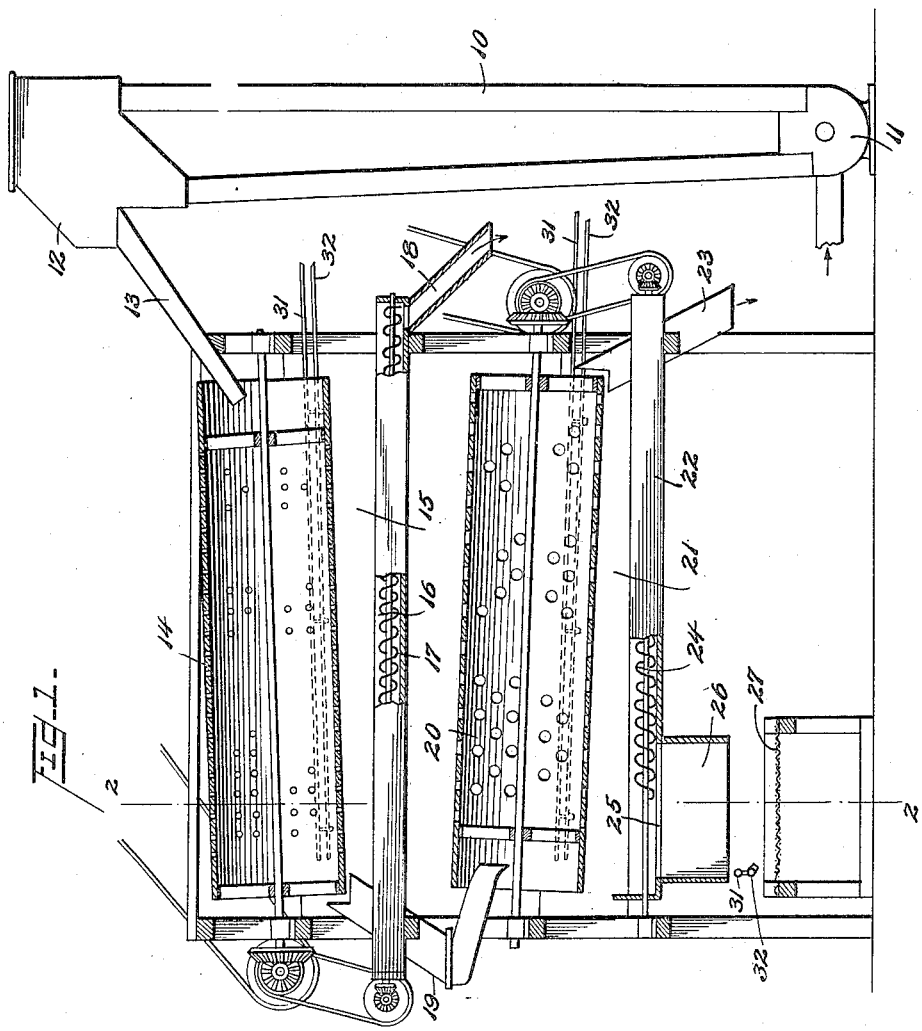
Inventor
T. P. Wallace,
By Watson, Coit, Morse & Grindle,
Attys

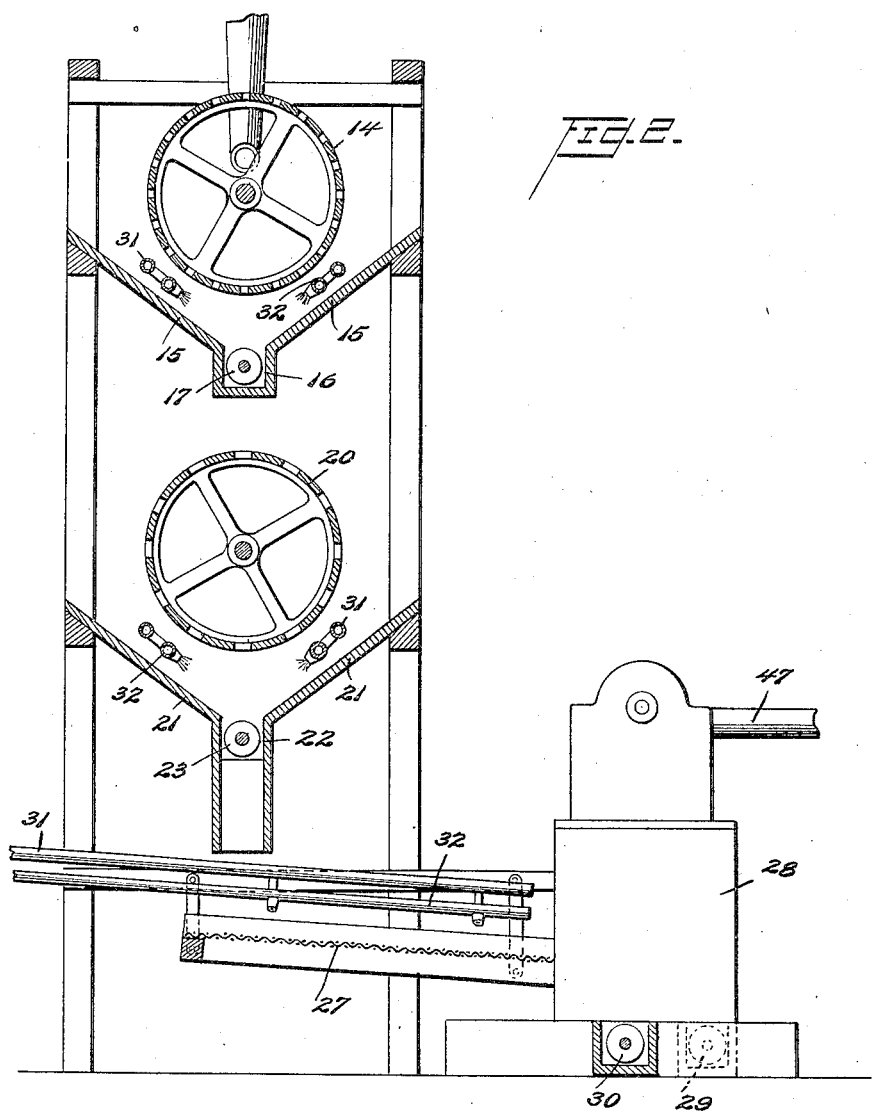

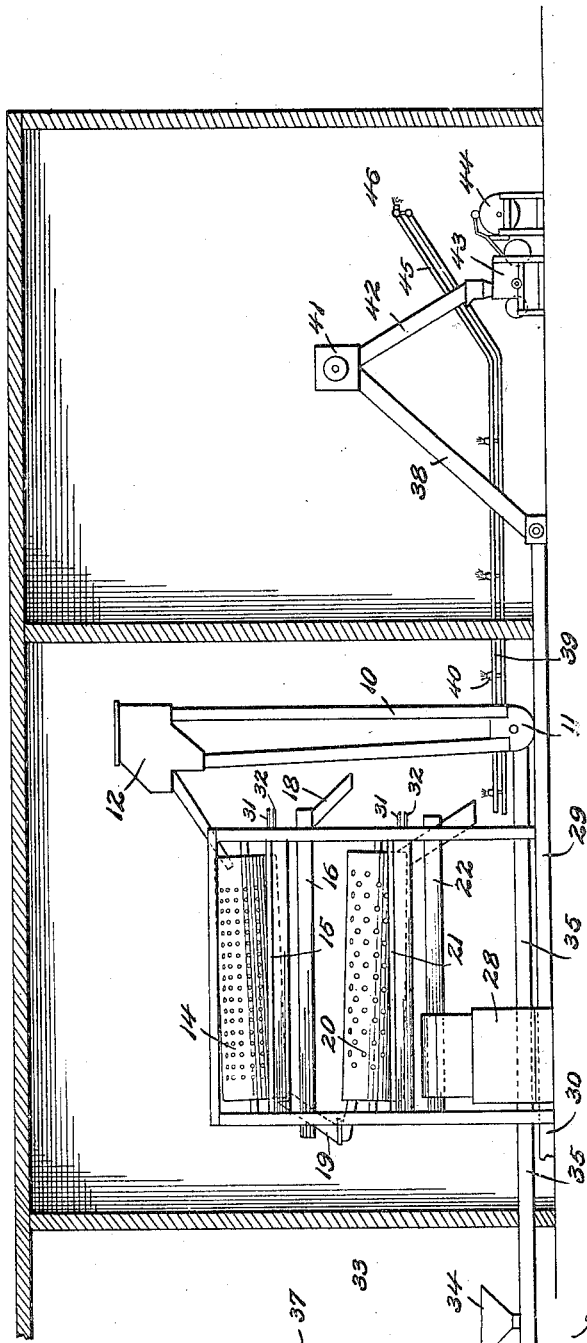

Patented Oct. 9, 1923.

1,470,339

UNITED STATES PATENT OFFICE.

THOMAS P. WALLACE, OF MEMPHIS, TENNESSEE.

METHOD OF TREATING COTTONSEED IN HANDLING, CLEANING, AND DELINTING.

Application filed November 22, 1920. Serial No. 425,760.

*To all whom it may concern:*

Be it known that I, THOMAS P. WALLACE, a citizen of the United States, and residing at Memphis, Shelby County, State of Tennessee, have invented certain new and useful Improvements in Methods of Treating Cottonseed in Handling, Cleaning, and Delinting, of which the following is a specification.

This invention relates to the treatment of cotton seed and consists in a method by which there is a very material saving of lint in handling cotton seed and particularly in cleaning and delinting it, and in which the final lint when removed in the delinting machine is cleaner, longer, more uniform and more valuable than in processes heretofore used, and the air surrounding the machines which perform these operations and in which the workmen must stay is much more pure and free from floating material and thus more comfortable as well as more healthful. The invention is based primarily on my discovery that the fine cotton fibre attached to the seed when it becomes dry as it will necessarily do in time is in a sense considerably more hard, brittle or breakable than when containing the proper amount of moisture, and that the fibres are thus inclined to break usually between their ends when subjected to strain such as by contact with other things in handling, conveying, cleaning or delinting, with the result that the fine broken particles of lint will be carried away in the air and will thus not only be lost for useful purposes but will contaminate the atmosphere where the workers are compelled to be. This presence of fine lint in the atmosphere of rooms and buildings where cotton seed is handled, cleaned and delinted has long been recognized as at least a disagreeable feature of the work aside from the loss of the lint. I have discovered that these troubles and difficulties can be avoided if the lint or fibre on the seed is brought to contain the right degree of moisture since it then becomes very pliable and no longer brittle and its strength and ability to stand the strain of contact and those incident to the removal of dirt and dust without breaking or pulling loose from the seed are greatly increased. I find that when properly moistened particles of the lint will not break off and be lost, contaminating the air, and that the cleaning can be done more thoroughly and completely, thus making a cleaner lint. Another advantage in the delinting operation is that the lint is not only all there on the seed and much cleaner, but the action of the saw teeth in the delinting machines is to loosen and break away the fibre directly at the seed instead of breaking or cutting it midway of its length, and thus each fibre having its full length is secured and the body of lint produced is much more uniform and valuable. This regulation of the moisture will furthermore make it possible to get a more uniform product of lint from different machines located in normally different atmospheric conditions, and also from the same machines under different conditions of the weather, whether dry or rainy. For purposes of illustration I have shown one specific arrangement of apparatus carrying out certain operations in which my process is used, but it will of course be understood that the process is applicable to the treatment of the seed in any form of apparatus where the objectionable features above noted were formerly present. Furthermore, while I have referred to cotton seed containing short fibre, my process may in some respects be applicable to cotton seed hulls containing some remaining short fibres or even to seed containing longer fibres of cotton than usual with ginned seed.

In the drawings:

Figure 1 is a vertical section through a well known form of seed cleaning mechanism, embodying means for moistening the air and the fibre in accordance with my invention.

Figure 2 is a cross section on the line 2—2 of Figure 1, showing the final seed cleaner in full lines.

Figure 3 is a diagrammatic showing of the arrangement by which my moistening process is applied to the seed and lint in the storage room, seed cleaning room, and linter room in succession.

While one of the main features of my invention is to properly moisten to the right degree the lint fibre on the seed, and while in the broader aspects of the invention this may be accomplished by any suitable means, I prefer to produce this moisture in the air surrounding the seed whereby the fibres will upon sufficient exposure absorb the moisture and become pliable and strong. Where the moisture is to be imparted altogether from the atmosphere in this way I find that an atmosphere containing from 4 to 8 degrees of moisture will serve best with most dry seed. It will be understood, however, that the percentage of moisture will vary according to the condition of the seed and in those cases where the seed are what may be called green and the fibre contains some natural moisture, a less degree of moisture will be necessary in the surrounding air. While the moisture may be imparted to the air surrounding the seed in any way, I prefer to have properly regulated spray nozzles for the moisture which may be operated by steam or air pressure discharging the water in the form of vapor.

In Figure 1 an elevator 10 of well known type raises the seed from a receptacle 11 to which they have been supplied from the seed storage room to an elevated discharge receptacle 12 from which they pass by the spout 13 into the end of the rotating perforated drum 14, called in commercial practise a sand reel. The perforations in this cylinder are of such size as to permit sand and small particles of dirt to pass through falling on the inclined side plates 15 and moving down into the conveyor trough 16, from which a screw conveyor 17 discharges them out through a spout 18. The perforations are too small to permit the passage of seed and since the cylinder is inclined the seed pass down to the funnel conveyor 19 and at its lower end enter the perforated cylinder 20 which in commercial practise is called a boll-reel. This cylinder 20 has perforations sufficiently large to permit the seed to pass through falling on the side plates 21, and being guided into the conveyor trough 22, while the bolls of unopen cotton or any foreign matter of sufficient size will not pass through the perforations but will by gravity and because of the incline of the cylinder travel down to the discharge spout 23. The seed collecting in the conveyor trough 22 are moved back to the left as shown in Figure 1 by the screw propeller 24 until they reach the opening 25 in the bottom of the conveyor, and passed down through the seed feeder 26 to the upper surface of the inclined wire screen 27 which sustains the seed without allowing them to pass through, and under shaking movement and gravity they pass down to and into the seed cleaner 28 shown in Figure 2. This seed cleaner operates by vacuum action to separate the seed from particles of metal or stone which are heavier, lifting the seed from the wire net screen and carrying them over and depositing them in the seed conveyor 29, while allowing the metal and other heavy particles to fall from the end of the screen into the conveyor 30. The air of course enters the seed cleaner below the wire screen 27 and passes up through it and is discharged from the cleaner through the outlet pipe 47 carrying with it any dust or fine material which may be drawn up with it. It is not believed necessary to give any more detailed description of this seed cleaning mechanism since it is in well known commercial use and will be understood by those skilled in the art. In adapting this machine to carry out my process I provide the necessary steam and water pipes, for instance 31 and 32, arranged in series and connected at points to provide discharge nozzles as shown particularly in Figure 2. It will be seen from this figure that the moisture is discharged adjacent to two perforated rollers 14 and 20 and above the plates 15 and 21, and that there are vapor pipes 32 over the screen 27 to maintain the moisture of the fibre.

In Figure 3 I have shown diagrammatically a seed storage room 33, having an inlet hopper 34 for the seed conveyor 35 operated in any suitable and well known way to supply seed to the receptacle 11 at the bottom of the elevator 10, and steam and water supply pipes 36 and 37 with vapor discharge nozzles are placed in the seed storage room to properly moisten the air and the lint on the seed as they are handled and before they enter the conveyor. The seed cleaning mechanism shown in Figure 3 into which the elevator 10 discharges and the arrangement of vapor discharge outlets therein correspond to what is shown more in detail in Figures 1 and 2. The conveyor 29 into which the seed fall from the seed cleaner 28 carries the seed to an elevator 38 in the room where the seed are to be delinted and the necessary pipes 39 and vapor spray nozzles 40 are placed along and above this conveyor. The elevator 38 deposits the seed in the receptacle 41 from which they pass down through the spout 42 and enter the delinting machine 43, which is of well known construction which will be understood fully by those skilled in the art without description. As is well understood in the art, the lint taken from the seed in this delinter passes to the rotating perforated drum 44 where it is collected and pressed into sheets. The necessary air, steam and water pipes for the vapor discharge near the delinting machine to maintain the atmosphere of the room at the proper moisture may be arranged in any suitable way to properly distribute the moisture in the particular arrangement of the mechanism. I have shown such pipes 45 and vapor discharge nozzles 46 raised slightly above the delinting machine and near the seed entering it. In all cases I prefer to so distribute the moisture as to make it substantially even throughout the various rooms so as to secure uniformity in the lint product and also to prevent contamination of the atmosphere in the rooms and to thus contribute to the health of the employees. After leaving the delinting machine the seed usually go to the rooms where the hullers and shakers are located which cut open the hulls and remove the meats from the seed and it is of considerable advantage to extend the operation of my process to those rooms, preventing any remaining fine lint and dust from contaminating the air.

Having thus described the invention, what is now claimed as new and desired to be secured by Letters Patent is:

1. The method of treating and cleaning cotton seed having fiber containing less than the desired degree of moisture which consists in producing and maintaining a sufficient degree of moisture for sufficient time in the atmosphere surrounding the seed to impart to the cotton fibers thereof the desired degree of moisture to soften or render said fibers more pliable and stronger and subjecting the seed to the cleaning operation in such condition, thus securing more effective removal and collection of dust and other foreign matter and reducing greatly the breakage of the short lint into minute particles which float around in and contaminate the surrounding air.

2. The method of treating cotton seed to save fiber and to avoid contaminating the atmosphere in the operations of cleaning seed by removal of dust and other foreign matter and in delinting the seed which consists in producing and maintaining a degree of moisture in the atmosphere around the seed during those operations so regulated in accordance with the moisture content of the fiber on the seed being treated as to impart to it and maintain in it that degree of moisture which will give it the desired flexibility and strength best adapted to prevent breakage of the short fibres into minute particles which would float around and contaminate the air.

In testimony whereof I affix my signature.

THOMAS P. WALLACE.